(12) United States Patent
Zhu et al.

(10) Patent No.: US 8,131,700 B2
(45) Date of Patent: Mar. 6, 2012

(54) TRANSITIONING CLONE DATA MAPS AND SYNCHRONIZING WITH A DATA QUERY

(75) Inventors: Yixue Zhu, Sammamish, WA (US); Robert H. Gerber, Bellevue, WA (US); Vishal Kathuria, Woodinville, WA (US); Samuel Hyrum Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 12/237,895

(22) Filed: Sep. 25, 2008

(65) Prior Publication Data

US 2010/0088289 A1    Apr. 8, 2010

(51) Int. Cl.
*G06F 17/30* (2006.01)
(52) U.S. Cl. ...................................................... 707/705
(58) Field of Classification Search .................. 707/101, 707/705; 709/223
See application file for complete search history.

(56) References Cited

U.S. PATENT DOCUMENTS 5,410,691 A    4/1995    Taylor
(Continued)

OTHER PUBLICATIONS

Amit Kumar Saran, "Conceptual Design and Implementation of a Distributed Database", 2 pages. http://students.iiitnet/~vishal/resume/amit/ddbms.html. Marc Pouly, "Distributed Databases in a Nutshell", Feb. 2005, 74 pages.

*Primary Examiner* — Etienne LeRoux
(74) *Attorney, Agent, or Firm* — Toler Law Group, PC

(57) ABSTRACT

Methods, systems, and computer-readable media are disclosed for transitioning clones and clone data access maps in response to node or media failure without blocking queries. In a system, a data request interface is configured to receive a query to access data at a storage device. Data management logic is configured to access clone state information of a plurality of clones including clones in a static state and clones in a transitory state. The data management logic is further configured to process the query to access the data according to the dynamic clone data access map, with functional correctness maintained.

24 Claims, 14 Drawing Sheets

U.S. PATENT DOCUMENTS

| | | |
|---|---|---|
| 6,014,669 A | 1/2000 | Slaughter et al. |
| 6,195,685 B1 | 2/2001 | Mukherjee et al. |
| 6,523,036 B1 | 2/2003 | Hickman et al. |
| 6,636,593 B1 | 10/2003 | MeLampy et al. |
| 7,076,508 B2 | 7/2006 | Bourbonnais et al. |
| 7,159,150 B2 | 1/2007 | Kenchammana-Hosekote et al. |
| 7,194,518 B2 | 3/2007 | Berkowitz et al. |
| 2005/0050071 A1 | 3/2005 | Debrunner |
| 2007/0043749 A1* | 2/2007 | Gerber et al. ................ 707/101 |

* cited by examiner

FIG. 7

| From\To | (P) | (S) | (R) | (O) | (T) | (D) | (X) |
|---|---|---|---|---|---|---|---|
| (P) Primary |  | C 716 | C 718 | I 710 | I 712 | I 714 |  |
| (S) Secondary | C 726 |  | C 728 | I 720 | I 722 | I 724 |  |
| (R) In-Refresh | C 730 | U 758 |  |  | R 740 | R 742 |  |
| (O) Offline | C 732 | R 744 | R 746 |  | U 760 | U 762 | U 764 |
| (T) Stale |  |  | R 748 |  |  | U 766 | U 768 |
| (D) Dropping |  |  | R 750 |  | U 770 |  | U 772 |
| (X) Non-Existent |  |  |  |  | U 774 | U 776 |  |

| 1 SMP=4 | 2 | 3 SMP=5 | 4 SMP=1 | 5 SMP=3 |
|---|---|---|---|---|
| Primary (2,21)<br>Shared-rowset<br>Secondary (4,41)<br>Shared-rowset<br>In-Refresh (3,31)<br>In-Refresh (4,42) | Primary (1,11)<br>Secondary (3,31) | Primary (4,43)<br>Secondary (1,12)<br>In-Refresh (4,44)<br>Shared-rowset<br>In-Refresh (3,32)<br>Shared-rowset | Primary (2,21)<br>Shared-rowset<br>Secondary (4,41)<br>Shared-rowset<br>In-Refresh (1,13)<br>In-Refresh (2,22) | Primary (3,33)<br>Secondary (2,23)<br>In-Refresh (4,44)<br>Shared-rowset<br>In-Refresh (3,32)<br>Shared-rowset |
| Data<br>Fragment 1 810 | Data<br>Fragment 2 820 | Data<br>Fragment 3 830 | Data<br>Fragment 4 840 | Data<br>Fragment 5 850 |

TRANSITIONING CLONE DATA MAPS AND SYNCHRONIZING WITH A DATA QUERY

BACKGROUND

A computer database system may be divided into partitions that are separately stored and accessed. The partitions may be divided into data fragments including a plurality of records or rowsets that may be stored on separate network nodes, allowing multiple queries for different records to be processed in parallel. To further improve reliability, the data fragments may be cloned. By maintaining multiple clones per data fragment, in the event that one clone becomes unavailable or becomes potentially or actually outdated as a result of a media failure or a host computer failure, one or more remaining clones may be used in order to preserve access to the data fragments.

While it may be advantageous to permit data to be read from or written to another clone when one clone is unavailable, this may result in different data being stored in clones that are intended to store the same data. It is also possible that, while clones of the same data fragment may store the same data, because of the unavailability of a clone, it may not be known whether a previously unavailable clone stores current data.

SUMMARY

A clone data map is used to maintain a transition status for clones and to allow access to the data fragments even when one or more of the clones of data fragments is in a state of transition. In maintaining a transition status in the clone data map, even when one clone is in transition (e.g. being refreshed, split, merged, or otherwise being operated upon), the clone data map enables read access or write access to other clones of the same data fragment. As a result, queries and other database operations are not blocked by operations performed on data fragments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 is block diagram depicting a clone access ticket illustrating compatibility of clone transition states;

FIG. 8 depicts a clone data map representing a transition status of a plurality of clones;

DETAILED DESCRIPTION

A method is disclosed that provides access to a plurality of data fragments. Each of the plurality of data fragments includes a plurality of clones. The plurality of clones includes a primary clone, at least one secondary clone, and at least one transitory clone. A query for a data set is received. The data set is associated with multiple versions of clone data maps including a first clone data map and a second clone data map (e.g., an old clone data map and a new clone data map). Both the first clone data map and the second clone data map are configured to map the data set to at least two different clones. The method also includes determining a delta corresponding to differences between the first clone data map and the second clone data map. From the delta, the method determines whether the query using the second clone data map (e.g., the new clone data map) can proceed while existing queries using the first clone data map (e.g., the old clone data map) remain in use.

According to another illustrative embodiment, a system includes a data request interface configured to receive a query to access data at a storage device. Data management logic is configured to access clone state information of clones including a first clone in a static state and a second clone in a transitory state. The data management logic is further configured to process the query to access the data when the data is associated with the first clone in the static state, but to avoid access to the data when the data is associated with the second clone in the transitory state.

According to another illustrative embodiment, a computer-readable medium includes a clone data map interface operative to detect a clone data map change. The clone data map change is operative to modify a clone data map having a first version of clone data to be modified to include a second version of the clone data. At least one data item in the second version of the clone data is different from a corresponding data item in the first version of clone data. A data request interface is operative to detect a database query. Database management logic is operative to selectively execute a database access operation in response to the database query based on an evaluation of the clone data map change.

Figure 1:
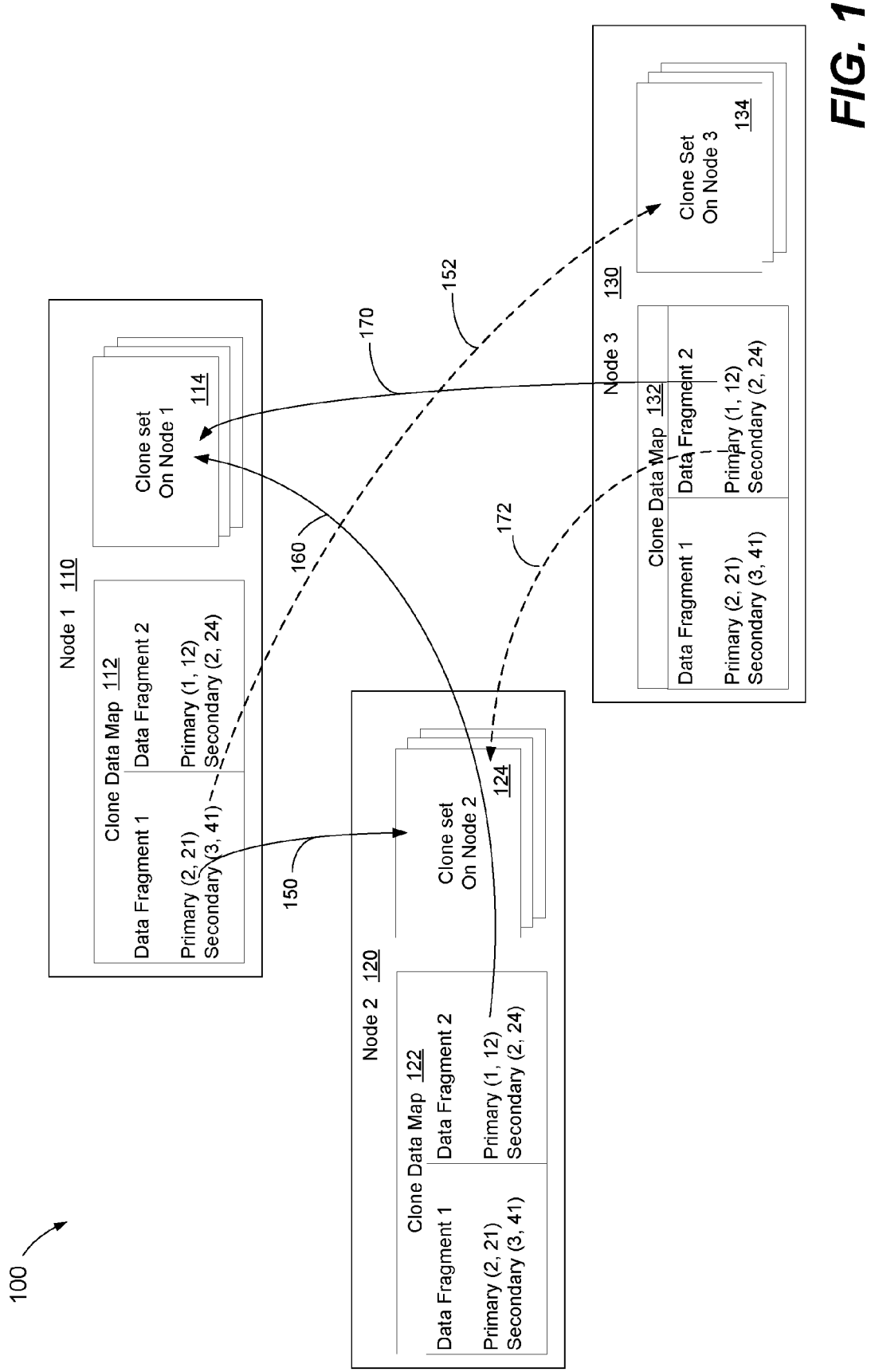
FIG. 1 depicts a distributed data environment in which clones of data fragments and clone data maps are stored on a plurality of nodes.

FIG. 1 depicts a distributed data environment 100 in which data fragments and copies of a clone data map are stored on a plurality of network nodes. Distributing the data fragments and multiple copies of the clone data map enable multiple queries to be concurrently processed by multiple nodes throughout the environment 100, as well as enabling multiple copies of the same data to be stored at different nodes to enable access to the data even when one or more of the nodes are not available.

The distributed data environment includes multiple nodes, such as node 1 110, node 2 120, and node 3 130. For purposes of example, assume that node 1 110 receives a query directed to a particular rowset maintained in a particular node, as explained below with respect to FIG. 3. Specifically, a query is directed to data associated with node 2, rowset 21, represented in FIG. 1 as "(2, 21)." Node 1 110 consults a copy of a clone data map 112 located on node 1 110. The clone data map 112 indicates that clone set 124 on node 2 120 maintains what is currently a primary copy of the data associated with node 2, rowset 21 or "(2, 21)." As indicated by arrow 150, the desired data is accessed from the clone set 124 disposed on node 2 120. However, if for some reason node 1 110 is unable to access node 2 120 to access the clone set 124 on node 2 120, node 1 110 seeks the data from a secondary repository. For example, node 2 120 may have suffered a host or "brick" failure such that node 2 120 is unavailable. The clone data map 112 on node 1 110 indicates that a secondary copy of the desired data (3.41) is maintained by a clone set 134 that resides on node 3 130. As indicated by dashed arrow 152, when node 2 120 is unavailable, node 1 110 seeks to access the secondary copy of the data from the clone set 134 on node 3 130.

In the distributed data environment 100, node 2 120 also may receive queries, concurrently or otherwise. For example, assume that node 2 120 receives a query directed to data associated with node 1, rowset 12, or "(1,12)." A clone data map 122 on node 2 120 indicates that the primary copy of the desired data is maintained by clone set 114 on node 1 110. According to one particular illustrative embodiment, node 2 120 first seeks the desired data from the clone set 114 on node 1 110, as indicated by arrow 160. However, if for some reason node 2 120 is unable to access node 1 110 to access the clone set 114 on node 1 110, node 2 120 seeks the data from a secondary repository. For example, node 1 110 may have suffered a host or "brick" failure such that node 1 110 is unavailable. The clone data map 122 on node 2 120 indicates that a secondary copy of the desired data (2, 24) is maintained by the clone set 124 that also happens to reside on node 2 120. Thus, according to one particular illustrative embodiment, when the primary copy of the desired data is unavailable, node 2 120 seeks to access the secondary copy of the data from the clone set 124 on node 2 120.

As a further example, node 3 130 also may receive queries, concurrently or otherwise. For example, node 3 130 may receive a query for data associated with node 1, rowset 12 (1, 12). A copy of the clone data map 132 stored on node 3 130 identifies the clone set 114 on node 1 110 as maintaining a primary copy of the desired data. As indicated by arrow 170, the desired data is accessed from the clone set 114 disposed on node 1 110. However, if for some reason node 3 130 is unable to access node 1 110, node 3 130 seeks the data from a secondary repository. The clone data map 132 on node 3 130 indicates that a secondary copy of the desired data (2,24) is maintained by the clone set 134 disposed on node 2 120. As indicated by dashed arrow 172, when node 1 110 is unavailable, node 3 130 seeks to access the secondary copy of the data from the clone set 124 on node 2 120. In short, the use of clones accessible via clone data maps provides data redundancy and increased data availability to support implementation of a distributed data environment.

For purposes of FIG. 1, the copies of the clone data maps 112, 122, and 132 are assumed to all be the same. However, it will be appreciated that, brick failures (i.e. a failure of a computer or a node) or other failures may result in the copies of the clone data maps failing to be identical. Embodiments of the present disclosure enable determination of clone data map equivalence and compatibility to enable different copies of the clone data maps to support queries in a distributed data environment, as further described below.

Figure 2:
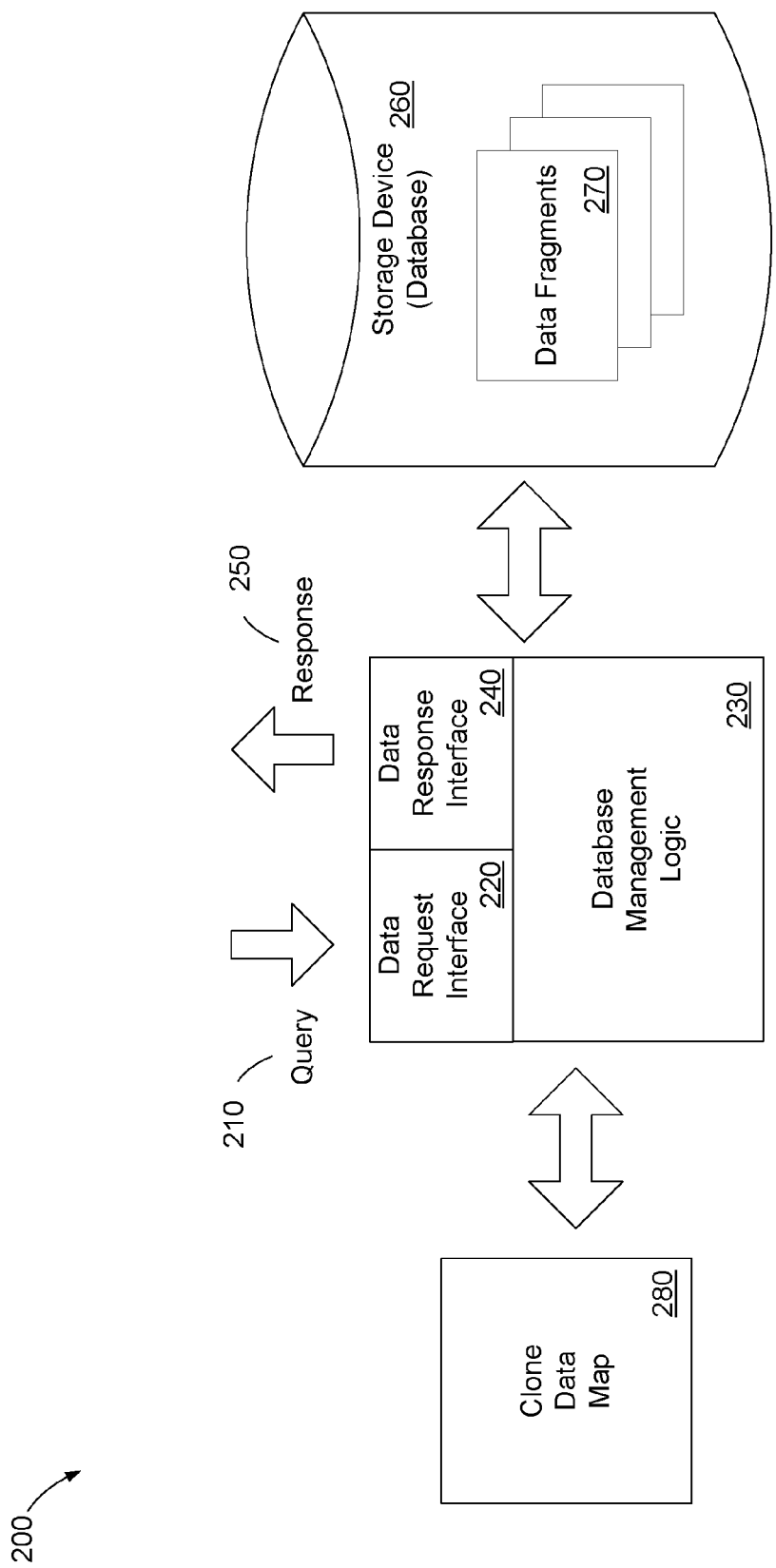
FIG. 2 is a block diagram of a computing environment including database management logic and a clone data map.

FIG. 2 is a block diagram of a computing environment 200 that responds to a query 210 through the use of database management logic 230 and a representative clone data map 280 as herein described. The query 210 is received by a data request interface 220 and passed to the database management logic 230. In order to determine a status of the requested data, the database management logic 230 accesses the clone data map 280 to identify from which of a plurality of clones 270 the requested data may be accessed. The plurality of clones 270 may be maintained in one or more storage devices 260 in a database or another data structure. The database management logic 230 accesses the clone data map 280 to determine which of the plurality of clones 270, if any, will provide the read access or write access sought by the query 210. Upon identifying one of the clones 270, if any, that is able to provide the desired access, the database management logic 230 communicates via a data response interface 240 to provide a response 250 to the query 210.

Figure 3:
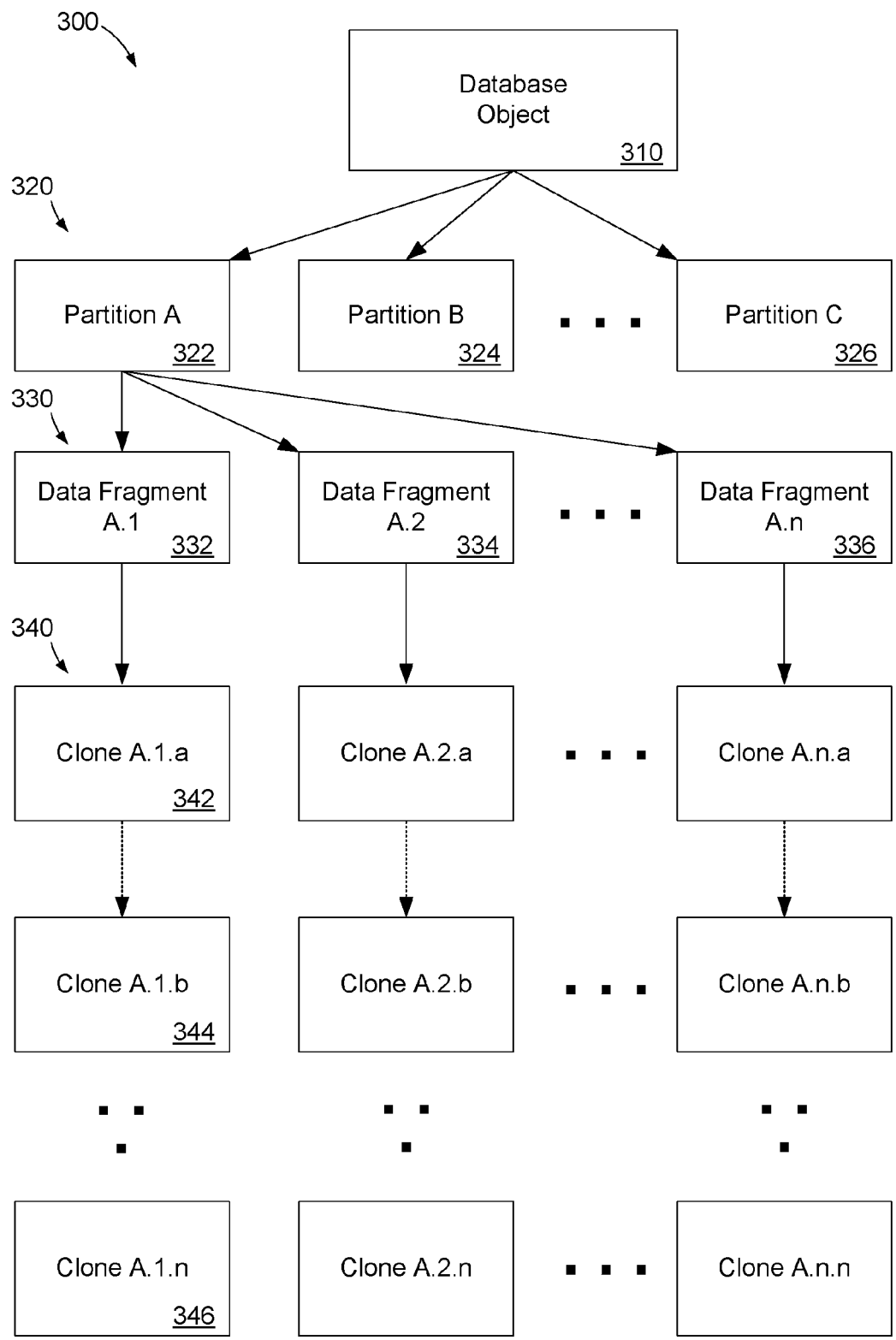
FIG. 3 is a block diagram of a database object divided into partitions, data fragments and clones.

FIG. 3 is a block diagram 300 depicting a database object 310 as divided into partitions 320 and data fragments 330 from which clones 340 are generated. The clones 340 each may include portions of the data fragments, as previously described with reference to FIG. 1.

The database object 310 is first divided into the plurality of partitions 320, including, for example, partition A 322, partition B 324, and partition C 326. The partitions 320 may be extracted based on each of the partitions 320 including a different functional segment of the database object 310 or may be extracted based on operational considerations relating to, for example, size or priority aspects of the database object 310.

Each of the partitions 320, such as partition A 322, is itself divided into a number of data fragments 330. For example, partition A 322 is divided into a plurality of data fragments including data fragment A. 1 332, data fragment A.2 334, through data fragment A.n 336.

Each of the data fragments 330 is then manifested in a plurality of clones 340. For example, portions of data fragment A.1 332 are manifested in a plurality of clones including clone A.1.a 342, clone A.1.b 344, through clone A.1.n 346, where each of the clones 340 includes a portion of the data associated with the data fragment 330. In an illustrative embodiment, each of the rowsets included in data fragment A.1 332 is manifested in at least two of the clones 340. The goal of manifesting each of the rowsets in two or more of the clones is that, if one of the clones 340 including a particular rowset experiences a failure, at least one clone maintaining the same rowset will remain available at any given time. As previously described, and as will be further described below, among the clones for each of the rowsets, one of the clones will be designated as a primary clone while another clone will be designated as a secondary clone. It should be noted, however, that the numeric designation of the clone, e.g., A.1.a versus A.2.a does not necessarily indicate that the first of the clones is the primary clone because a status of a clone as a primary clone or a secondary clone may change during the course of operation as further described below.

Figure 4:
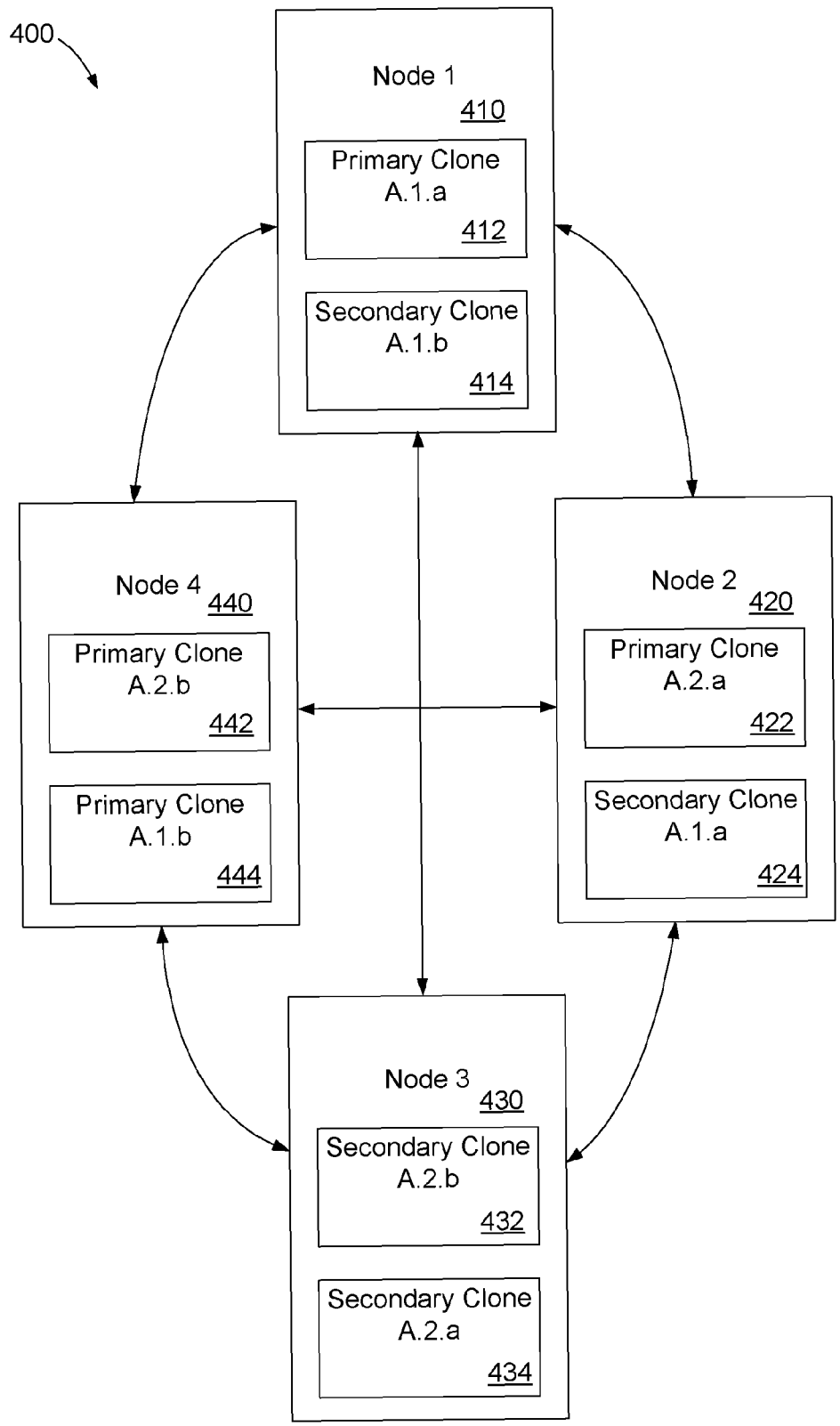
FIG. 4 is a block diagram of a computer network where clones are deployed on different network nodes.

FIG. 4 a block diagram of a computer network 400 including a plurality of nodes 410 through 440 where clones are deployed. Taking the example where there are two clones created for each of the data fragments, two clones are deployed in the computer network 400 for each of a number of data fragments. For example, node 1 410 maintains primary clone A.1.a 412 and secondary clone A.1.b 414. Node 2 420 maintains secondary clone A.1.a 424. In addition to maintaining secondary clone A.1.a 424, node 2 420 also maintains primary clone A.2.a 422. Node 3 430 maintains secondary clone A.2.b 432 and secondary clone A.2.a 434. Node 4 440 maintains primary clone A.2.b 442 and primary clone A.1.b 444. It should be appreciated that a particular node may store primary and secondary clones, or may store only primary clones or secondary clones.

By deploying the clones on different nodes 410 through 440 across the computer network 400, at least one of the clones is available for data operations if one of the nodes fails. Thus, for example, if node 1 410 experiences a host or "brick" failure, a query directed to a data set maintained by primary clone A.1.a 412 will be able to execute the query on secondary clone A.1.a 424 deployed on node 2 420.

However, when node 1 410 comes back online, primary clone A.1.a 412 may store out-of-date data. In such a case, a status of each of the clones is assessed to determine whether a clone is available and usable. In addition, it should be noted that if a query seeks write access to a particular clone, it may not matter that the clone is stale or obsolete; because the data stored in the clone is to be overwritten. Thus, as further described below, it is useful for a clone data map to maintain a status of a clone data to indicate when a clone is stale or otherwise potentially unusable because, for a write operation, that clone is usable when another, up-to-date clone may be unavailable. In such a case, the query may still be executed.

Figure 5:
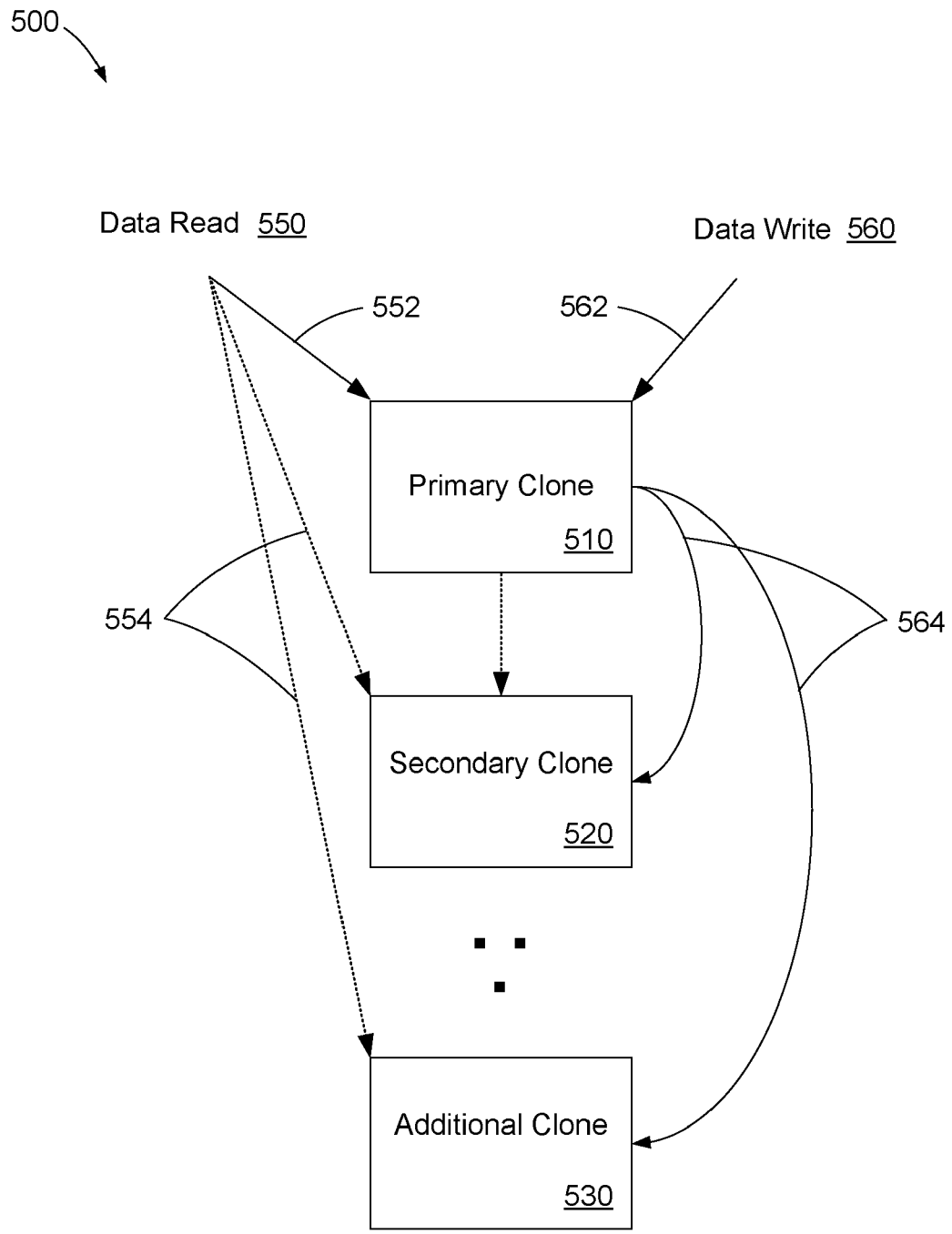
FIG. 5 is a block diagram depicting read access and write access to data stored in a plurality of clones.

FIG. 5 is a block diagram 500 depicting read access and write operations performed on data stored in a plurality of clones 510, 520, and 530 that are associated with a same data set or rowset. A data read operation 550, in contrast to a data write operation 560 for reasons previously explained, requires current data to successfully respond to the query. The data read operation 550 may first proceed against a primary clone 510 (as indicated by the solid line 552) to secure the desired data set. However, if the desired data set is not available from the primary clone 510 because the network node on which the clone resides is unavailable or because the clone data map indicates that the data is out of date or not usable, the data read operation 550 may proceed against a secondary clone 520 or an additional clone 530 (as indicated by the dotted lines 554). Thus, the data read operation 550 may proceed against the primary clone 510 or, if the primary clone 510 is unavailable or usable, the data read operation 550 may proceed against one of the other clones 520 or 530.

In the case of the data write operation 560, any change to the data in one of the clones 510, 520, and 530 is propagated to the other clones. For example, the data write operation may proceed first against the primary clone 510 (as shown by the solid line 562). After completion of the data write operation 560, the data written to the primary clone 510 is replicated to the secondary clone 520 and any other clones associated with the same data set or rowset, such as the additional clone 530 (as shown by the solid lines 564) to maintain currency of the data stored in the clones to support subsequent operation. Nonetheless, it should be appreciated that a clone data map should maintain a specific clone status of each of the clones 510-530 to enhance data availability. For example, as previously described, while the secondary clone 520 may be subject to refresh after the conclusion of the data write operation 560, if the primary clone 510 becomes unavailable when an additional data write operation 560 is initiated, one of the other clones 520 or 530 could process the data write operation 560 without waiting for the primary clone 510 to again become available. The primary clone 510 then could be refreshed to be made current.

Alternatively, the secondary clone 520 or the additional secondary clone 530 could be designated as a new primary clone. If the secondary clone 520 becomes the primary clone, the additional clone 530 then may be designated as a new secondary clone. Alternatively, the additional clone 530 may be designated as the new primary clone with secondary clone 520 remaining as a secondary clone 520. In either case, the previous primary clone 510 could be released to be used for other purposes, such as becoming a clone associated with another data set.

Figure 6:
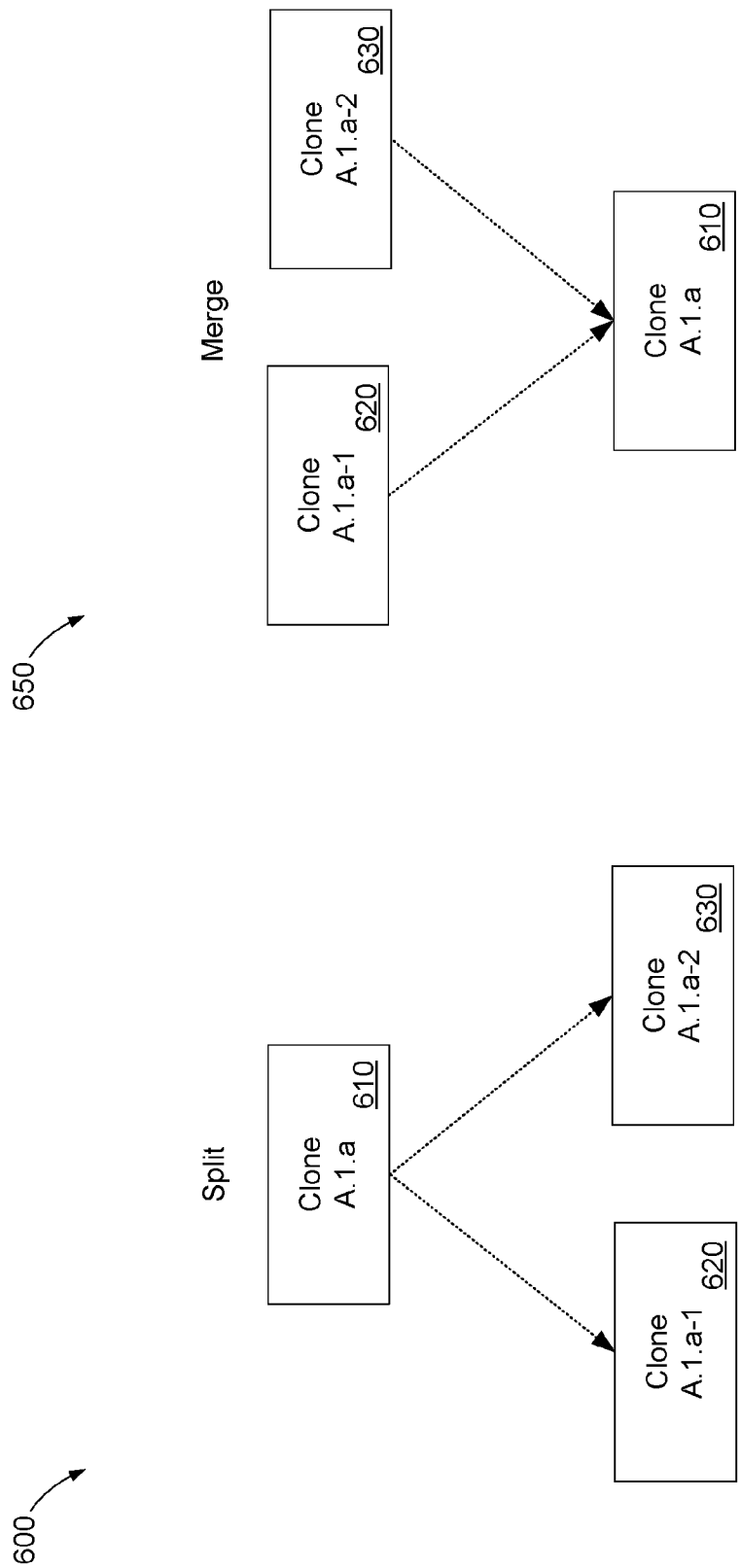
FIG. 6 illustrates splitting and merging of clones.

Embodiments of the present disclosure may be used to maintain database access during the course of administrative database operations. For example, as illustrated in FIG. 6, it may become desirable to perform a split operation 600 or a merge operation 650 on existing clones. The split operation 600 is performed for example, when the data stored in a clone A.1.a 610 has become too large or, for performance considerations, it is desirable to separate parts of the data set or rowset stored in the clone A.1.a 610 to make the data set or rowset available from two separate clones. The clone A.1.a 610 thus may be divided into a clone A.1.a-1 620 and a clone A.1.a-2 630. During the split operation 600, as data is written to the new clones 620 and 630, the new clones 620 and 630 may not be available for read operations but may potentially be available for write or update operations. As further described below, a clone data map associated with the clones specifically indicate a status of the clones to determine whether a query directed to the data being split may be executed.

Correspondingly, the merge operation 650 may be performed, for example, to recapture storage space, by combining separate clones into a single clone. For example, the clone A.1.a-1 620 and the clone A.1.a-2 630 may be merged back into the clone A.1.a 610. During the merge operation 650, the data stored in the existing clones 620 and 630 may be current for read operations. Again, the clone data map specifically indicates a status of the clones to permit the read operation to proceed even during (i.e. prior to completion) the merge operation 650. It should be noted that the clone A.1.a-1 620 and the clone A.1.a-2 630 constitute split merge pairs or split merger partners, and will be designated accordingly in an embodiment of a clone data map, as described further below.

As clones are read, updated, split, merged, or lost due to brick failure, or otherwise may be in the process of being changed (or failing to be changed to remain current), the clones enter a transitory state. The transitory state may include a transition that includes one or more atomic transition states while the clone is in transition from an initial state to a next state. Various clone states are listed in Table (1), while atomic transition states or transition atoms, are listed in Table (2), below:

TABLE (1)

Clone Atomic Transition

| Atomic Transitions | State |
|---|---|
| Primary (P) | Data is up-to-date for read or write access to the clone |
| Secondary (S) | Data is up-to-date for read or write access to the clone (when Primary is not available) |
| Offline (O) | Data was up-to-date, but is not available due to brick failure or other failure |
| In-Refresh (R) | Data is potentially out-of-date; available for write access but not read access |
| Stale (T) | Data is regarded as out-of-date; clone is not used |
| Dropping (D) | Row set maintained in clone is to be dropped; state is maintained to transition clone from use to non-use |

TABLE (2)

Clone Transition Atoms

| Transition Atoms | Description |
| --- | --- |
| x -to- T or<br>x -to- R | New clone is created in stale<br>or in-refresh state |
| D -to- T and<br>D -to- R | To-be-dropped clone could<br>be used like new clone |
| D -to- x or<br>T -to- x | To-be-dropped or stale<br>clone is dropped |
| T -to- R | Stale clone to in-refresh state |
| R -to- D or<br>R -to- T or<br>R -to- S | In-refresh clone to to-be-dropped,<br>stale, or secondary state |
| S -to- D or<br>S -to- T | Secondary clone to to-be-dropped<br>or stale state |
| S -to- R | Secondary to in-refresh state |
| S -to- O | Secondary to offline state |
| P -to- S | Secondary (or completed in-refresh)<br>becomes new primary and old<br>primary becomes secondary; will be<br>accompanied by another clone<br>in transition S -to- P or R -to- P) |
| P -to- O | Primary to offline state |
| O -to- S | Offline to secondary state |
| O -to- P | Offline to primary state |
| P -to- T | Secondary (or completed in-refresh)<br>becomes new primary and old<br>primary goes stale; will be accompanied<br>by another clone in<br>transition S -to- P or R -to- P |
| P -to- D | Secondary (or completed in-refresh)<br>becomes new primary and old<br>primary is to be dropped; will be<br>accompanied by another clone in<br>transition S -to- P or R -to- P |
| Fragment Split | A new fragment is created with<br>all the same row sets (which are<br>now shared) as the old fragment |
| Fragment Merge | Two split-merge-partner fragments<br>are combined into a single<br>fragment, with the requirement that<br>all non-to-be-dropped clones<br>are shared row sets |
| Fragment SMP-<br>Set/Clear | Set (or clear) the Split-Merge-<br>Partnership (SMP) between two<br>fragments. When clearing, all shared<br>row set clones are to be in to-be-<br>dropped state |

According to an illustrative embodiment, a single clone transition may be composed of or regarded as one or more atomic transitions. Some atomic transitions listed may not be used. For example, the atomic transition x-to-T is not likely to be used because it may not be beneficial to create a new clone only to place it in a stale state. Similarly, multiple atomic transitions, such as the first ten atomic transitions listed in Table (1), may not be applied to the same clone transition. For example, transitioning a clone from x-to-R and R-to-S would, in effect, transition a newly created clone into a secondary clone (x-to-S) without a clone refresh performed to populate the newly-created clone with usable data.

As previously described, a clone data map maintains the state of the clones. As also previously described, different clones associated with the same data set may be in transition and be in different transition states from one another. For example, what previously was a primary clone may be offline, stale, or in refresh while the previous secondary clone becomes the primary clone or otherwise assumes a new state. As also previously described, to enable efficient access to the clones, multiple clone data maps may be disposed on different nodes in the environment so that waiting for a single clone data map does not become a bottleneck that impedes data operations. When a query is presented, the clone data map presented is updated to be consistent with other clone data maps so that incompatible operations are not performed on the clones. To this end, it is desirable that a query is presented with a unified version of the clone data map information.

In one embodiment, a unified version of the clone data map information is termed a clone access ticket. The clone access ticket is operative to present a single version of the clone data map information while still enabling concurrent access to clones. Thus, the clone access ticket is a form of the clone data map information that enables concurrent operations to access the clones and make resulting changes to the clone data maps as long as the changes to the clone data maps are equivalent or compatible. By controlling the permissible transitions of the clones, the clone data map information presents a clone access ticket of a single version of the clone data map information. It should be noted that two equivalent or compatible clone access tickets may include copies of a same, up-to-date clone data map or an out-of-date clone data map and a delta list that includes the changes to be made to the clone data map to render the map an up-to-date.

For a given clone, two clone access tickets or a clone access ticket and a delta list are regarded as access-mode equivalent if the mapping of the data set requested to data sets or rowsets stored in the clones is identical for all possible data rows. Thus, two clone access tickets are regarded as data-read equivalent if data sets represented in the clone access tickets map any row to the same set of primary rowsets and to the same set of secondary rowsets after the current clone transition is complete. Two clone access tickets are data-update equivalent if the clone access tickets also map to the same in-refresh rowsets. It should be noted that two clone access tickets being regarded as data-update equivalent implies that the two clone access tickets are also data-read equivalent.

Evaluating what constitutes two clone access tickets being access-mode equivalent enables a determination of whether a particular clone state transition is to wait for a clone access ticket to be released for updating before the particular clone state transition can be completed. In particular, if information presented by a clone access ticket before a clone state transition is data-read equivalent to a clone access ticket modified to reflect a clone state transition, then the clone state transition can be completed without waiting for a data-read access mode query to be completed. Similarly, if information presented by a clone access ticket before a clone state transition is data-update equivalent to a clone access ticket modified to reflect a clone state transition, then the clone state transition can be completed without waiting for a data-update access mode query to be completed. Thus, data-update equivalent clone state transitions can be completed without blocking data-update access mode queries, whether those queries seek to read or update data.

In addition to two clone access tickets being data-read equivalent or data-update equivalent, two clone access tickets also may be regarded as compatible. Two different clone access tickets may be regarded as compatible if multiple queries using a data-read access mode or a data-update access mode will read clones so that all read operations read up-to-date data. Clone access ticket compatibility enables some concurrent data operations to be performed "online," where the resulting clone states involved in an operation do not involve locking the clone access tickets from performing other operations while another operation is being performed. For example, if primary or secondary clones from which data may be read in both the previous and subsequent versions of the clone access ticket also will be updated by all data-write operations using either the previous version of the clone access ticket or the subsequent version of the clone access ticket, a new query may be initiated using the new, subsequent clone access ticket while previously submitted queries are still using the previous version of the clone access ticket.

It should be noted that data-read equivalent clone state transitions are necessarily clone access ticket compatible transitions. Data-read equivalent clone state transitions do not change which rows are read from primary and secondary rowsets; thus, the transactions will read the same, current data. Data-read equivalency implies clone access ticket compatibility because, as previously described, data-update equivalence implies data-read equivalence. The only kind of clone state transitions as described in Table (2) that are incompatible are those that change which clone is the primary clone or the secondary clone, and, thus could not be performed using the previous version of the clone access ticket.

FIG. 7 is a table 700 that illustrates which atomic transitions are equivalent or compatible and that allow a clone access ticket to be regarded as equivalent or compatible to enable online transactions.

Referring to FIG. 7, the table 700 illustrates that a clone transition from a primary state to an offline state 710, to a stale state 712, or to a dropping state 714 is incompatible (I). It would not be safe for multiple queries to be performed using the data-read access mode and the data-update access mode because the clone transitions 710-714 result in the primary clone becoming unusable. On the other hand, the table 700 illustrates that a clone transition from a primary state to a secondary state 716 or to an in-refresh state 718 is compatible (c). The table 700 also illustrates that a clone transition from a secondary state to an offline state 720, to a stale state 722, or to a dropping state 724 is incompatible. Note this transition will be read-access equivalent if queries read primary clones only. By contrast, a clone transition from a secondary state to a primary state 726 or to an in-refresh state 728 is clone access table compatible. Other compatible states include the transition of either an in-fresh clone to a primary clone 730 or of an offline clone to a primary clone 732.

Several other transitions are regarded as read-access equivalent (R). An in-refresh clone transitioning a stale state 740 or to a dropping state 742 are read-access equivalent. An offline clone transitioning to a secondary state 744 is read-access equivalent. A clone transitioning from a stale state to an in-refresh state 746, from a dropping state to an in-refresh state 748, or from a non-existent state to an in-refresh state 750 is also considered read-access equivalent.

Other transitions are considered update-access equivalent (u). It should be recalled that update-access equivalence implies read-access equivalence, as previously described. A transition of a clone from an in-refresh state to a secondary state 758 is considered update-access equivalent. A transition of an offline clone to a stale state 760, to a dropping state 762, or to a non-existent state 764 is considered update-access equivalent. A transition of a clone from a stale state to a dropping state 766 or to a non-existent state 768 is regarded as update-access equivalent. A transition of a clone from a dropping state to a stale state 770 or to a non-existent state 772 is also considered update-access equivalent. A transition of a clone from a non-existent state to a stale state 774 or to a dropping state 776 is also considered update-access equivalent.

In addition to presenting clone state information about a plurality of clones, the clone access ticket also includes a clone update identifier (CUID). A single CUID is assigned to a table. The CUID is generated by, maintained by, and accessed from the clone access ticket, and is changed when the set of clones in a table is updated. In other words, clone state transitions trigger issuance of a new CUID.

In an illustrative embodiment, the CUID is a four-byte value. When CUIDs are centrally generated, and they only change with clone state transitions, a four-byte CUID may be sufficient. For example, if an average of one clone state transition per second could take place, for a single table it would be more than 136 years before the four-byte CUID would repeat a number. In an illustrative embodiment, a clone access ticket also may maintain some additional information applicable to its algorithmic functioning. This may include some versioning information needed for concurrency control, such as what type of transition may be underway in a cached clone access ticket.

Clone access tickets are used in one of three modes: data-read access mode, data-update access mode, and clone access table update mode. Data-read access mode enables a module using the clone access table to read clone information about primary clones and secondary clones, but does not allow access to information about transitory state clones. This provides stability of the set of primary clones and secondary clones for the clone access table. In one embodiment, read-only queries obtain clone access tickets using the data-read access mode.

Data-update access mode provides a more general level of access. Data-update access mode enables access to clones in a primary state, a secondary state, and in an in-refresh state. Clone access ticket mode, by contrast, gives access to all clone access tickets as well as the ability to perform clone transitions. However, only a single clone access ticket is able to be afforded this access to avoid conflicting actions being performed on the clone access ticket.

FIG. 8 depicts a clone access ticket 800 that maintains a transition status of a plurality of clones. For purposes of this example, the clone access ticket 800 maintains a transition status on clones belonging to five data fragments including data fragment 1 810, data fragment 2 820, data fragment 3 830, data fragment 4 840, and data fragment 5 850. A split merge partner indicator (SMP) 812 for data fragment 1 810 indicates that data fragment 1 810 is a split merge partner with data fragment 4 840, as is also reflected by an SMP indicator 842 for data fragment 4 840 identifying data fragment 1 810. Similarly, an SMP indicator 832 for data fragment 3 830 indicates that data fragment 3 830 is a split merge partner with data fragment 5 850, as is also reflected by an SMP indicator 852 for data fragment 5 850 identifying data fragment 3 830.

The clone access ticket 800 indicates a current status of each of the data fragments 810-850. For example, data fragment 1 810 contains a primary clone associated with node 2 and rowset 21 (e.g., the designation 2, 21). Data fragment 1 810 also contains a secondary clone associated with node 4 and rowset 41. It should be noted that data fragment 4 840 shares a primary clone and a secondary clone with data fragment 1 810. The split merge partner indicator 812, plus the indication that each of these data sets is a "shared-rowset" indicates that data fragment 1 810 is in the process of being split into two data fragments including data fragment 1 810 and data fragment 4 840.

Data fragment 1 810 and data fragment 4 840 also contain data sets that are in-refresh. Data fragment 1 810 contains in-refresh data sets associated with node 3, rowset 31 and node 4, rowset 42. Data fragment 4 840 contains in-refresh data sets associated with node 1, rowset 13 and node 2, rowset 22.

Figure 9:
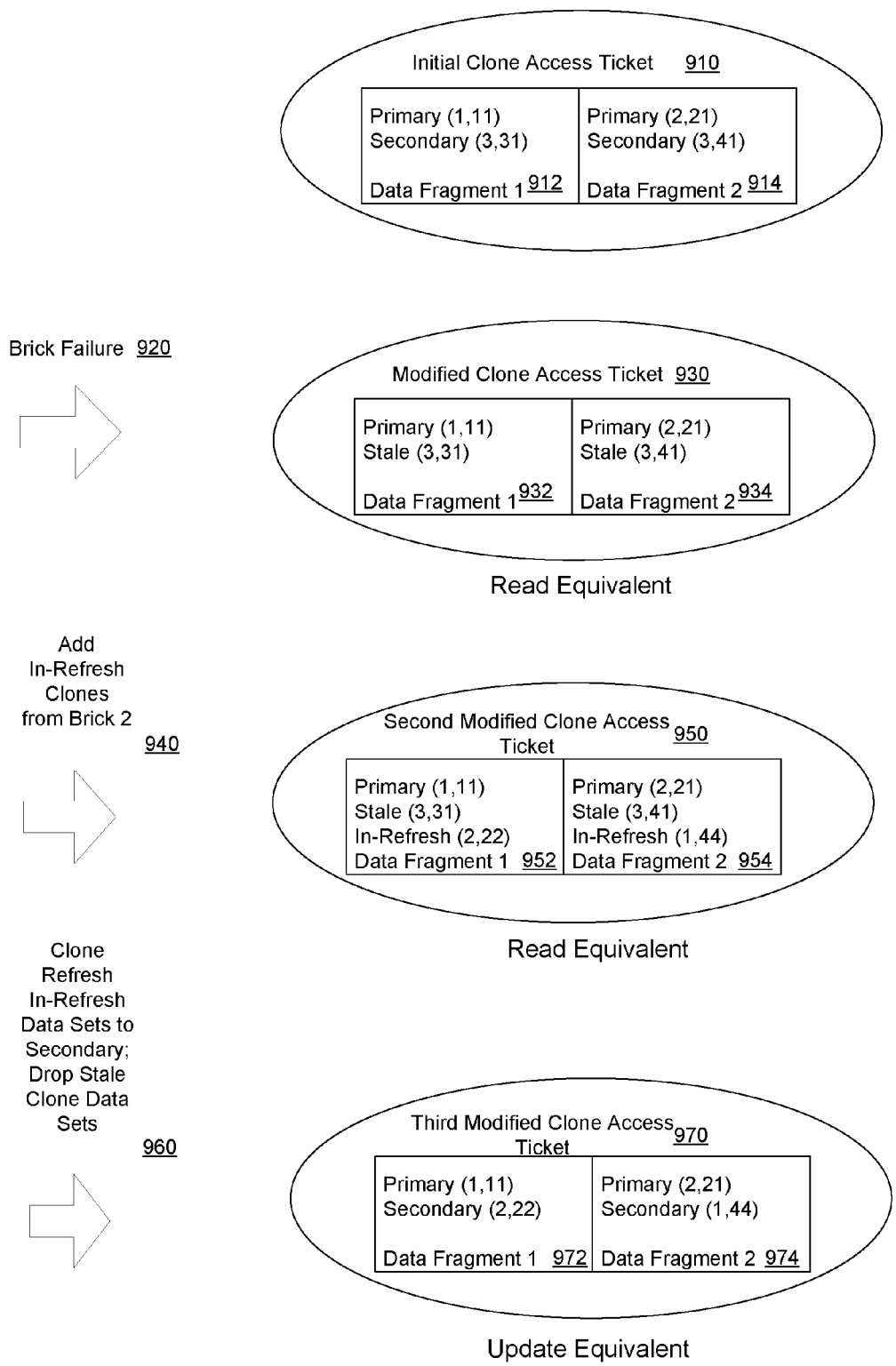
FIGS. 9-11 illustrate clone transitions depicted in a clone data map providing examples of equivalency.
Figure 10:
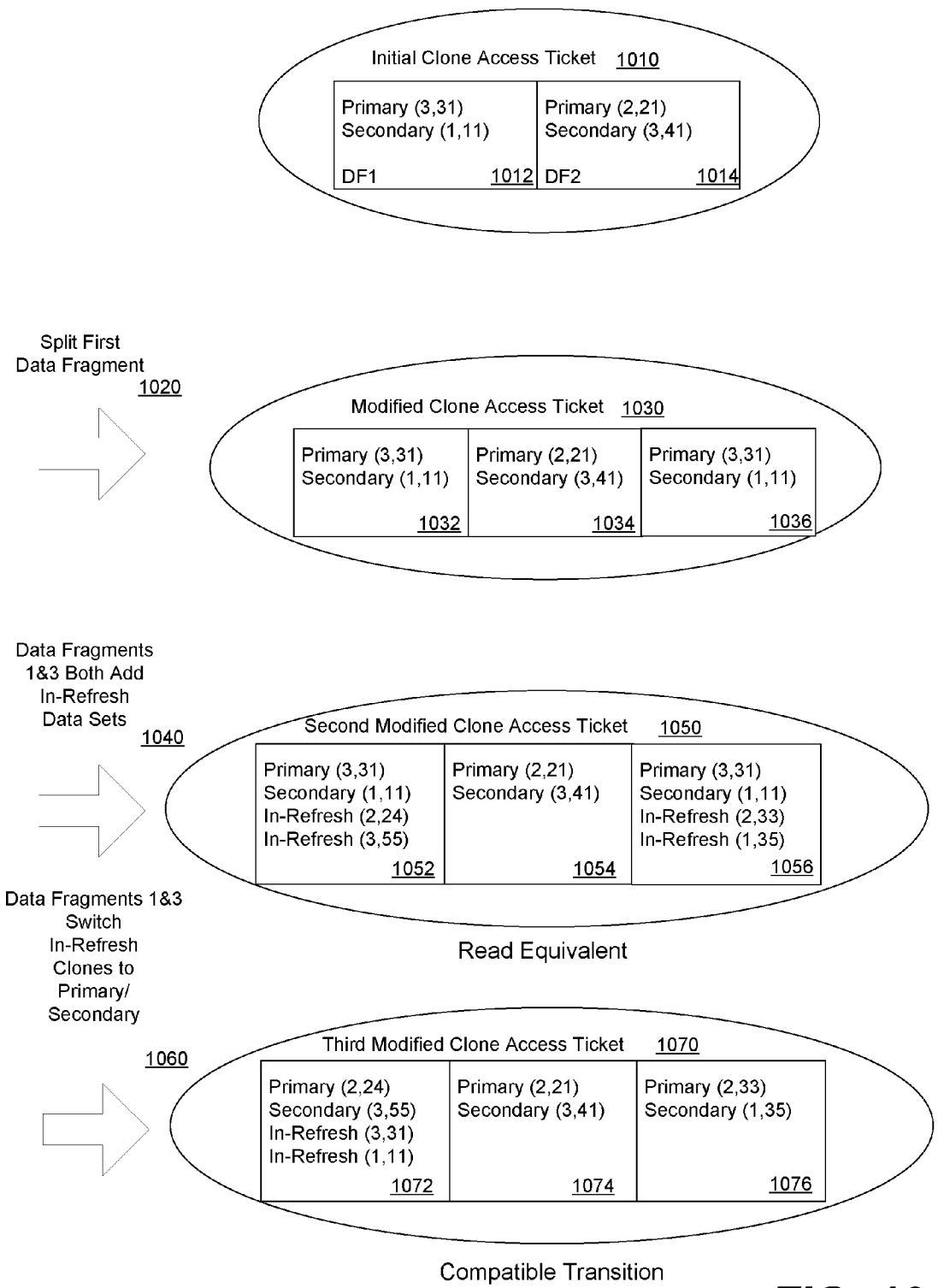
Figure 11:
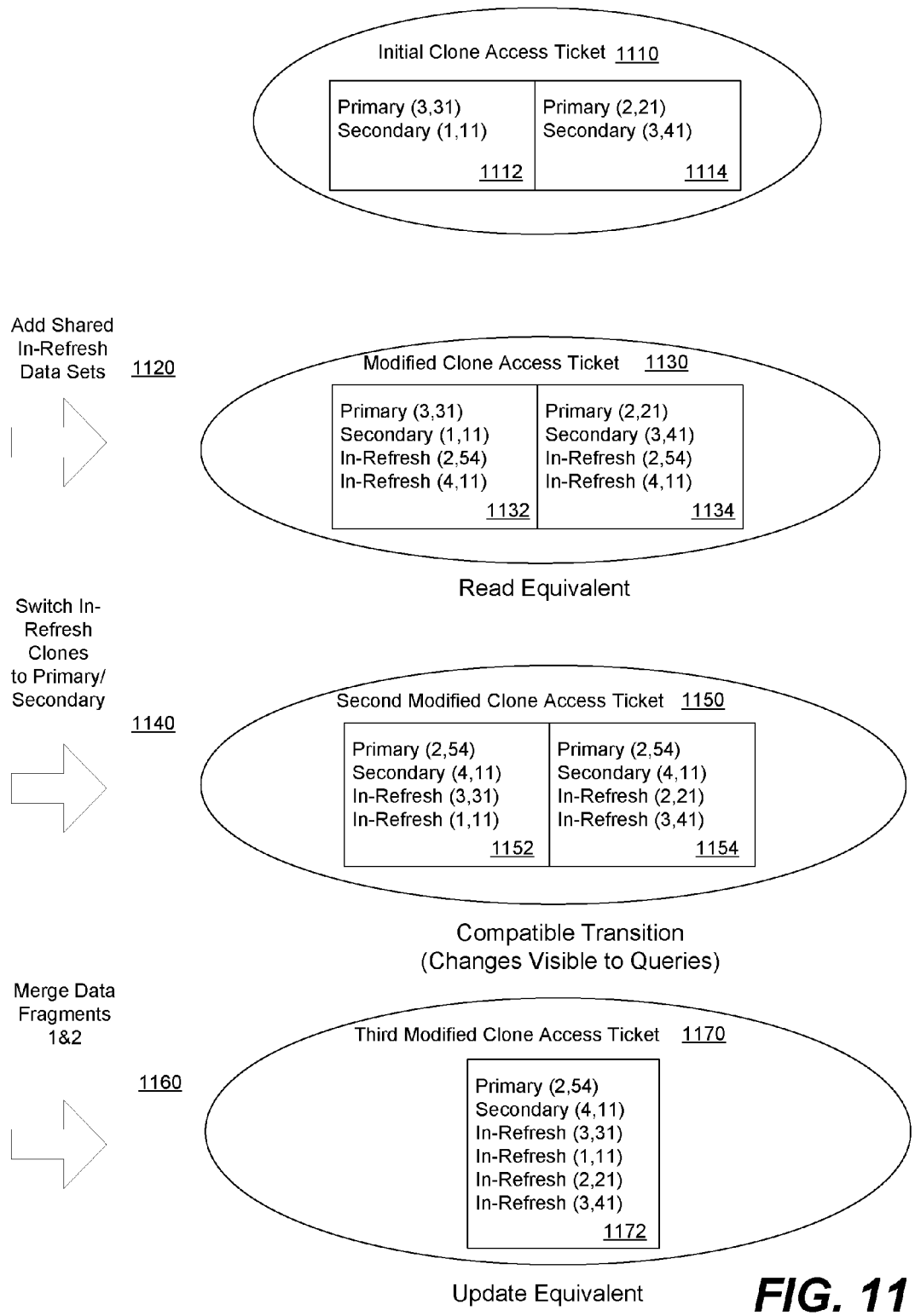

FIGS. 9-11 illustrate use of clone access tickets responding to exemplary events to illustrate various read-access and update-access equivalences as well as a compatible transition as previously described. FIG. 9 shows an initial clone access ticket 910 that includes clone data map information for a first data fragment 912 and a second data fragment 914. The first data fragment 912 contains a primary clone associated with node 1, rowset 11 and a secondary clone associated with node 3, rowset 31. The second data fragment 914 contains a primary clone associated with node 2, rowset 21 and a secondary clone associated with node 3, rowset 41. The data set associations with the logical data fragments and rowsets will herein be designated with the notation used in the figures. For example, the data set associated with node 1 and rowset 11 is listed as (1,11), as in the figures.

A brick failure 920 results in a modified clone access ticket 930. In the modified clone access ticket 930, the first data fragment 932 still contains the primary clone (1,11), but as a result of the brick failure, the data set (3,31) which was the secondary clone has now transitioned to a stale state. Similarly, in the modified clone access ticket 930, the second data fragment 934 still contains the primary clone (2,21), but as a result of the brick failure 920, the data set (3,41) which was the secondary clone has transitioned to a stale state. However, despite the transitions to stale states, the modified clone access ticket 930 is still deemed read equivalent because the modified clone access ticket 930 still maps to the same data sets after the transition caused by the brick failure.

In-refresh clones from another brick are added at 940, resulting in a second modified clone access ticket 950. New in-refresh data sets (2,22) and (1,44) are added to the first data fragment 952 and to the second data fragment 954, respectively. However, because the newly added data sets do not affect the data sets read by queries, the second modified clone access ticket 950 is data-read equivalent after the transition at 940.

A clone refresh results in in-refresh data sets being transitioned from an in-refresh state to a secondary state and stale data sets are dropped at 960, resulting in a third modified clone access ticket 970. As a result, in the third modified clone access ticket 970, the first data fragment 972 contains the primary clone (1,11) and the secondary clone (2,22). The second data fragment 974 contains the primary clone (2,21) and the secondary clone (1,44). Because the third modified clone access ticket 970 still maps to the same rowsets read by queries after the transition, the third modified clone access ticket 970 is considered data-update equivalent.

FIG. 10 shows an initial clone access ticket 1010 that includes clone data map information for data fragments 1012 and 1014. The first data fragment 1012 contains a primary clone (3,31) and a secondary clone (1,11). The second data fragment 1014 contains a primary clone (2,21) and a secondary clone (3,41).

The first data fragment 1012 is split at 1020, resulting in a modified clone access ticket 1030. In the modified clone access ticket 1030, the first data fragment 1032 and the third data fragment 1036 share the primary clone with the data set (3,31) and the secondary clone with the data set (1,11). The second data fragment 1034 is not changed.

Both the first data fragment 1032 and the third data fragment 1036, a split merge pair, add in-refresh data sets at 1040, resulting in a second modified clone access ticket 1050. The second data fragment 1054 remains unchanged and still contains the primary clone (2,21) and the secondary clone (3,41). The first data fragment 1052 and the third data fragment 1056 still share primary clones with the same data set (3,31) and secondary clones with the same data set (1,11). However, in addition, the first data fragment 1052 is associated with in-refresh data sets (2,24) and (3,55), and the third data fragment 1056 is associated with in-refresh data sets (2,33) and (1,35). However, despite the addition of the in-refresh data sets, the second modified clone access ticket 1050 still maps to the same data sets read by queries and, thus, is still deemed data-read equivalent.

The in-refresh data sets maintained by the first data fragment 1052 and the third data fragment 1056 are transitioned to primary and secondary states and the previous primary and secondary data sets for the first data fragment 1052 and the third data fragment 1056 are transitioned to in-refresh states at 1060, resulting in a third modified clone access ticket 1070. Because the third modified clone access ticket 1070 maps to the same data sets maintained by queries but the primary clones change to in-refresh state, the third modified clone access ticket 1070 is considered compatible.

FIG. 11 shows an initial clone access ticket 1110 that includes clone data map information for a first data fragment 1112 and a second data fragment 1114. The first data fragment 1112 contains a primary clone (3,31) and a secondary clone (1,11). The second data fragment 1114 contains a primary clone (2,21) and a secondary clone (3,41).

In-refresh data sets are added at 1120, resulting in a modified clone access ticket 1130. In the modified clone access ticket 1130, the first data fragment 1132 still contains the primary clone (3,31) and the secondary clone (1,11). The second data fragment 1134 still contains the primary clone (2,21) and the secondary clone (3,41). In addition, the same in-refresh data sets (2,54) and (4,11) are added to the first data fragment 1132 and the second data fragment 1134. Because the modified clone access ticket 1130 maps to the same data set read by queries, the modified clone access ticket 1130 is regarded as read equivalent.

The in-refresh data sets are transitioned to primary and secondary status while the data sets previously associated with primary and secondary status are transitioned to in-refresh status at 1140. The transition results in a second modified clone access ticket 1150. Because the second modified clone access ticket 1150 maps to the same data sets maintained by queries but primary clones change to in-refresh, the clone access ticket is regarded as a compatible transition.

The first data fragment 1152 and the second data fragment 1154 are merged at 1160, yielding a third modified clone access ticket 1170 having a single data fragment 1172. Because the data map change does not impact read or write, multiple queries performing data-read operations and data-update operations can be performed. As a result, the transition to the third modified clone access ticket 1170 is regarded as a data-update equivalent transition.

Figure 12:
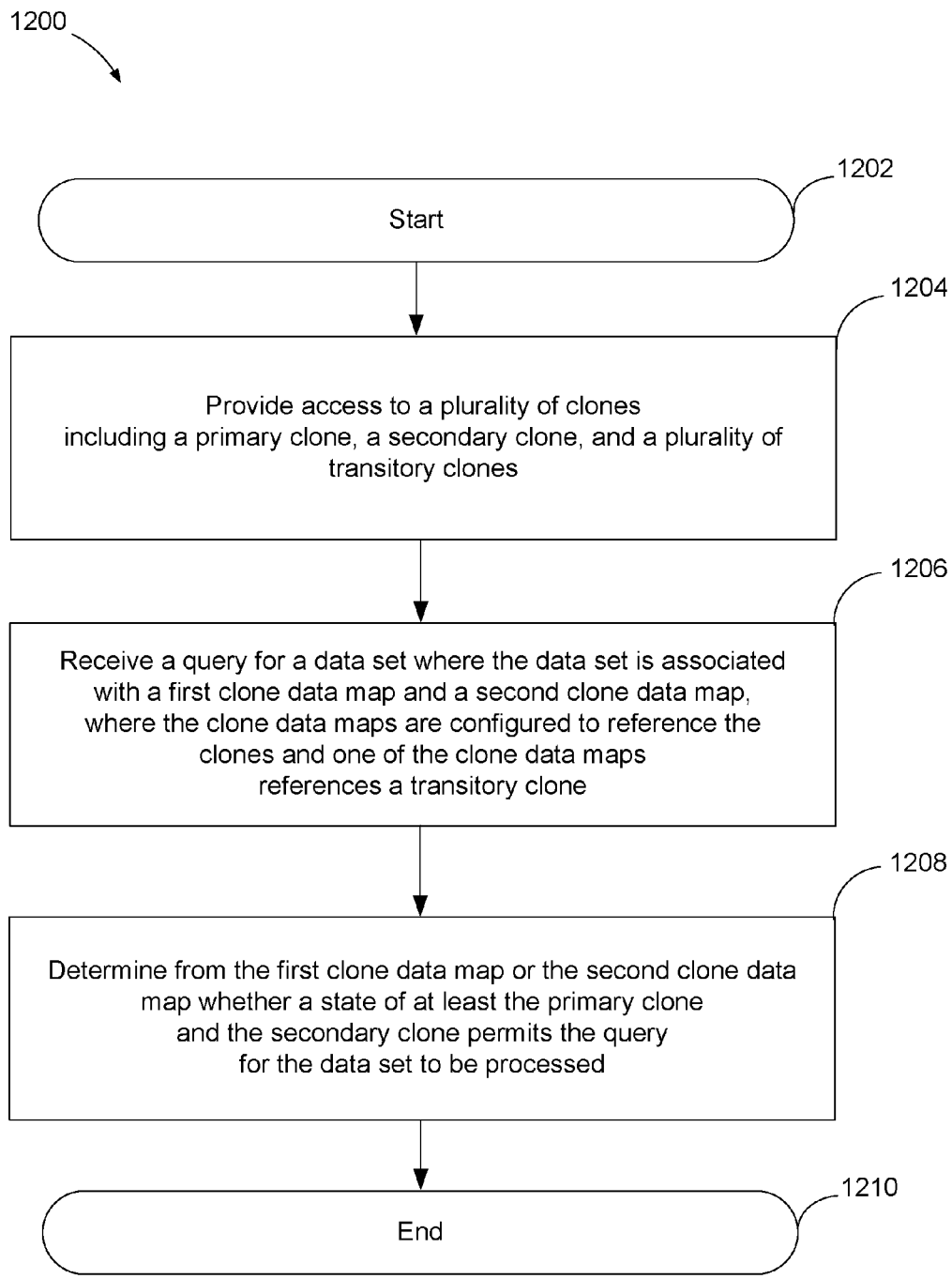
FIG. 12 is a flow diagram depicting a first particular illustrative embodiment of a method of responding to a data query using clone data maps.

FIG. 12 is a flow diagram 1200 of a particular illustrative embodiment of a method of determining whether a query may proceed against a data set associated with a plurality of clones. The method begins at 1202. At 1204, access is provided to a plurality of data fragments where the data fragments include a primary clone, a secondary clone, and a plurality of transitory clones. At 1206, a query is received to access a data set where the data set is associated with a first clone data map and a second clone data map. The clone data maps are configured to map the data set to the clones and at least one of the clone data maps references a transitory clone. At 1208, it is determined from the first clone data map or from the second clone data map whether the query for the data set using second clone data map can proceed while the first clone data map is being used by existing queries. The method ends at 1210.

Figure 13:
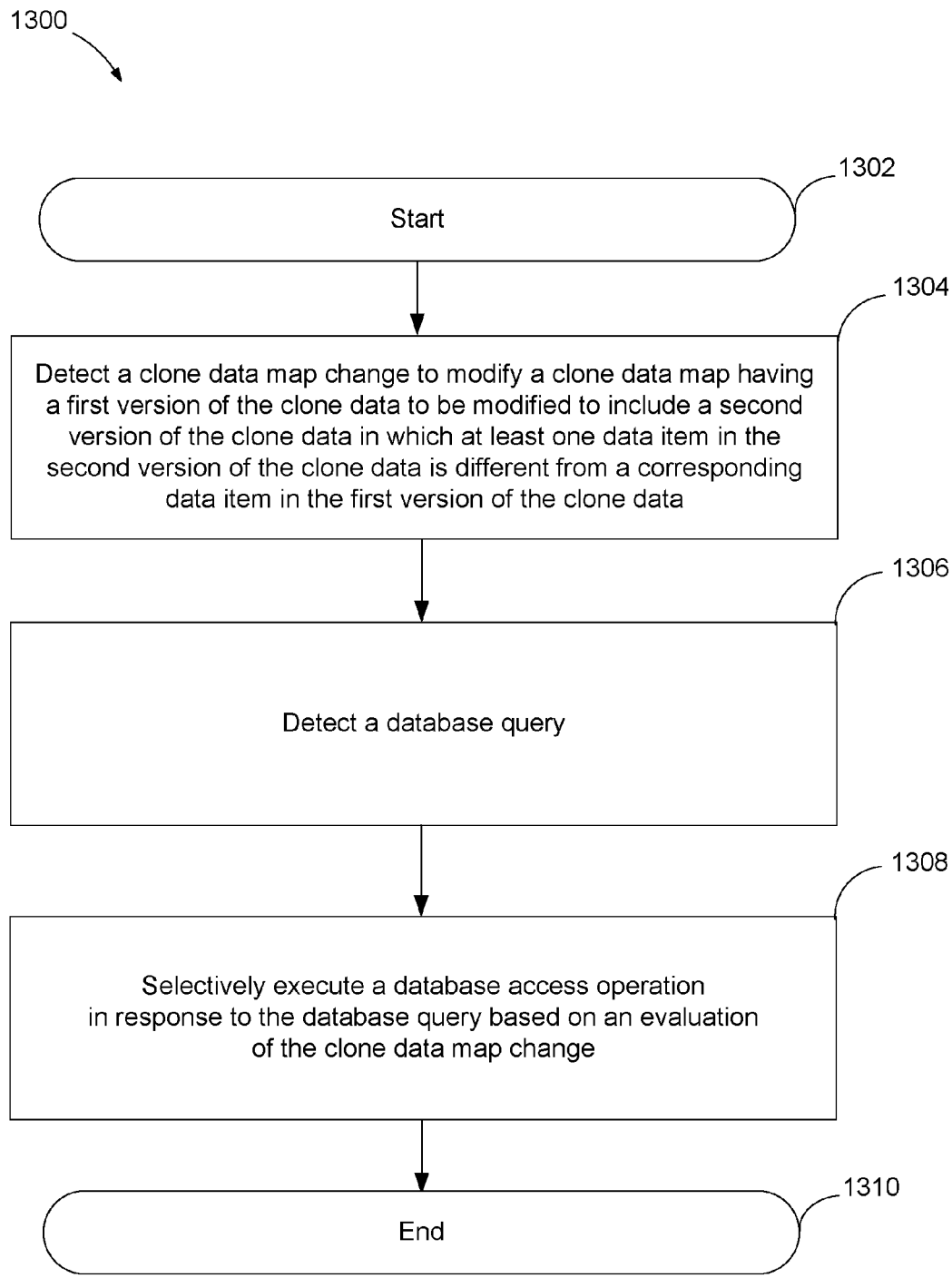
FIG. 13 is a flow diagram depicting a second particular illustrative embodiment of a method of responding to a data query using clone data maps.

FIG. 13 is a flow diagram 1300 of a particular illustrative embodiment of a method of selectively executing a database query based on a state of a clone data map. The method begins at 1302. At 1304, a clone data map change to modify a clone data map is detected. In the clone data map, a first version of the clone data is to be modified to include a second version of the clone data in which at least one data item in the second version of the clone data is different from a corresponding data item in the first version of the clone data. At 1306, a database query is detected. At 1308, a database access operation is selectively executed in response to the database query based on an evaluation of the clone data map change. The method ends at 1310.

Figure 14:
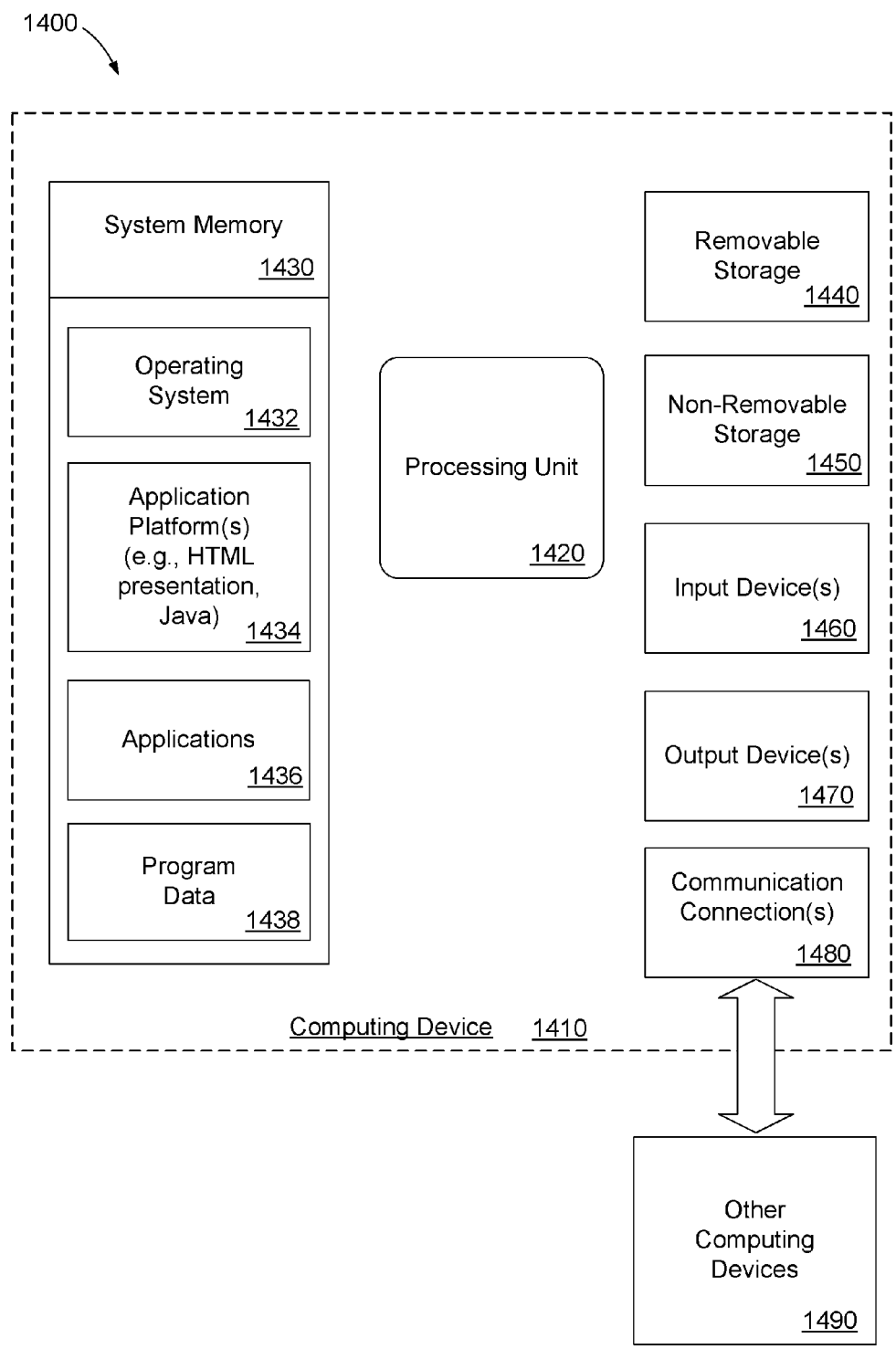
FIG. 14 is a block diagram depicting a general purpose computing system operable to enable computer-implemented methods and computer-readable media.

FIG. 14 shows a block diagram of a computing environment 1400 including a general purpose computer device 1410 operable to support embodiments of computer-implemented methods and computer program products according to the present disclosure. In a basic configuration, the computing device 1410 may include a server configured to process transactions received over a network such as described with reference to FIG. 1.

The computing device 1410 typically includes at least one processing unit 1420 and system memory 1430. Depending on the exact configuration and type of computing device, the system memory 1430 may be volatile (such as random access memory or "RAM"), non-volatile (such as read-only memory or "ROM," flash memory, and similar memory devices that maintain the data they store even when power is not provided to them) or some combination of the two. The system memory 1430 typically includes an operating system 1432, one or more application platforms such as an object-oriented platform 1434 such as Java, one or more applications 1436, and may include program data 1438.

The computing device 1410 may also have additional features or functionality. For example, the computing device 1410 may also include removable and/or non-removable additional data storage devices such as magnetic disks, optical disks, tape, and standard-sized or miniature flash memory cards. Such additional storage is illustrated in FIG. 14 by removable storage 1440 and non-removable storage 1450. Computer storage media may include volatile and/or non-volatile storage and removable and/or non-removable media implemented in any method or technology for storage of information such as computer-readable instructions, data structures, program components or other data. The system memory 1430, the removable storage 1440 and the non-removable storage 1450 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1410. Any such computer storage media may be part of the device 1410. The computing device 1410 may also have input device(s) 1460 such as a keyboard, mouse, pen, voice input device, touch input device, etc. Output device(s) 1470 such as a display, speakers, printer, etc. may also be included.

The computing device 1410 also contains one or more communication connections 1480 that allow the computing device 1410 to communicate with other computing devices 1490, such as one or more client computing systems or other servers, over a wired or a wireless network. The one or more communication connections 1480 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 14 or otherwise described in the previous paragraphs are necessary to support embodiments as herein described.

The steps of a method or algorithm described in connection with the embodiments disclosed herein may be embodied directly in hardware, in a software component executed by a processor, or in a combination of the two. A software component may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an integrated component of a computing device or a user terminal. In the alternative, the processor and the storage medium may reside as discrete components in a computing device or user terminal.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   providing access to a plurality of data fragments, wherein each of the plurality of data fragments includes a plurality of clones, wherein the plurality of clones includes a primary clone, at least one secondary clone, and at least one transitory clone;
   receiving a query for a data set, wherein the data set is associated with multiple versions of clone data maps including a first clone data map and a second clone data map, wherein both the first clone data map and the second clone data map are configured to map the data set to at least two different clones of the plurality of clones, and
   determining from a delta corresponding to differences between the first clone data map and the second clone data map whether the query using the second clone data map can proceed while existing queries using the first clone data map remain in use.

2. The method of claim 1, wherein the first clone data map includes an old clone data map, and wherein the second clone data map includes a new clone data map.

3. The method of claim 1, wherein:
   the first clone data map includes a first clone update identifier, wherein the first clone update identifier indicates a status of the first clone data map responsive to a change to one or more of the primary clone and the secondary clone; and
   the second clone data map includes a second clone update identifier, wherein the second clone update identifier indicates a status of the second clone data map responsive to a change to one or more of the primary clone and the secondary clone; and
   a currency status of the first clone data map with respect to the second clone data map is determined by comparing the first clone update identifier to the second clone update identifier.

4. The method of claim 3, wherein when the first clone update identifier differs from the second clone update identifier, further comprising determining whether the first clone data map is equivalent to the second clone data map to enable a specified operation requested in the query.

5. The method of claim 3, wherein the query is operative to request a specified version of the data set and wherein at least one of the first clone update identifier and the second clone update identifier is evaluated to determine whether the specified version of the data set is available.

6. The method of claim 5, further comprising determining that the first clone data map is read-access equivalent to enable the query to read the primary clone or the secondary clone.

7. The method of claim 6, further comprising determining that the first clone data map is update-access equivalent to enable the query to write to the primary clone or to the secondary clone.

8. The method of claim 3, further comprising designating an access mode of one or more of the first clone data map and the second clone data map as being in one of:
   a data-read access mode, permitting reading of the data set from the primary clone and the secondary clone; and
   a data-update access mode, permitting reading of the data set from the primary clone and the secondary clone and permitting writing of the data set to the data set of the primary clone, the secondary clone, and to the transitory clone.

9. The method of claim 3, further comprising providing a clone data map update mode, to permit access to modify contents of the first clone data map and the second clone data map.

10. The method of claim 9, wherein accessing the first clone data map and the second clone data map via the clone data map update mode includes transitioning one or more of the primary clone and the secondary clone from a current state to a next state.

11. The method of claim 9, further comprising holding the query when a lock is placed on the first clone data map and the second clone data map while the first clone data map and the second clone data map are subject to the clone data map update mode, wherein the lock includes one of a read lock, an update lock, and a delete lock.

12. The method of claim 3, further comprising presenting a clone access ticket that represents a unified status of the plurality of data fragments.

13. The method of claim 3, wherein the first clone data map and the second clone data map include one of:
   an up-to-date clone data map and an out-of-date clone data map;
   an up-to-date clone data map and an out-of-date clone data map associated with a delta describing changes between the out-of-date clone data map and the up-to-date clone data map, wherein application of the delta to the out-of-date clone data map renders the out-of-date clone data map equal to the up-to-date clone data map; and
   copies of an up-to-date clone data map.

14. A system, comprising:
   a data request interface configured to receive a query to access data at a storage device; and
   data management logic configured to access clone state information of a plurality of clones including a first clone in a static state and a second clone in a transitory state and configured to split data associated with the first clone in the static state into paired clones, wherein the paired clones transition to an in-refresh state while a portion of the data associated with the first clone is written to the paired clones,
   wherein the data management logic is further configured to process the query to access the data when the data is associated with the first clone in the static state, but to avoid access to the data when the data is associated with the second clone in the transitory state.

15. The system of claim 14, wherein the static state is one of:
   a primary state, wherein the first clone in the primary state supports the data in an up-to-date state permitting the data to be written to or read from the first clone; and
   a secondary state, wherein the first clone in the secondary state supports the data in an up-to-date state permitting the data to be written to or read from the first clone when the first clone in the primary state is unavailable.

16. The system of claim 15, wherein the transitory state is one of:
   an off-line state, wherein the second clone in the off-line state supported the data in an up-to-date state before access to the second clone was lost as a result of a failure;
   a stale state, wherein the second clone in the stale state is regarded as out-of-date;

a dropping state, wherein the second clone in the dropping state is to be dropped, indicating that queries are to no longer access the second clone;

an in-refresh state, wherein the second clone in the in-refresh state is regarded as potentially out-of-date and the query can access the second clone to update the data;

a new state, wherein the second clone in the new state is made available as a new clone available for storage of new data; and a nonexistent state, wherein the second clone in the nonexistent state is not considered to be available.

17. The system of claim 14, wherein the second clone in the transitory state transitions to a different state in a transition including one or more atomic transitions, the atomic transitions including one of transitioning the second clone:
from the new state to the stale state;
from the new state to the in-refresh state;
from the dropping state to the new state;
from the dropping state to the in-refresh state;
from the dropping state to the nonexistent state;
from the stale state to the nonexistent state;
from the stale state to the in-refresh state;
from the in-refresh state to the dropping state;
from the in-refresh state to the stale state;
from the in-refresh state to the secondary state; and
from the off-line state to the secondary state.

18. The system of claim 17, wherein the first clone in the static state transitions to a different state in a transition including at least one of the one or more atomic transitions, the atomic transitions further including transitioning the first clone:
from the primary state to the secondary state when the second clone transitions from the secondary state to the primary state;
from the primary state to the secondary state when the second clone transitions from the in-refresh state to the primary state;
from the primary state to the stale state when the second clone transitions from the secondary state to the primary state;
from the primary state to the stale state when the second clone transitions from the in-refresh state to the primary state;
from the primary state to the dropping state when the second clone transitions from the secondary state to the primary state;
from the primary state to the dropping state when the second clone transitions from the in-refresh state to the primary state;
from the secondary state to the dropping state;
from the secondary state to the stale state;
from the secondary state to the in-refresh state; and
from the secondary state to the off-line state.

19. The system of claim 14, further comprising merging the portion of the data split between the paired clones into the first clone, wherein the first clone transitions to the in-refresh state while the portion of the data is written to the first clone.

20. A computer-readable storage device having computer-executable components, the computer-executable components comprising:
a clone data map interface operative to detect a clone data map change, the clone data map change to modify a clone data map having a first version of clone data to be modified to include a second version of clone data, wherein at least one data item in the second version of clone data is different from a corresponding data item in the first version of clone data;
a data request interface operative to detect a database query; and
database management logic operative to selectively execute a database access operation in response to the database query based on an evaluation of the clone data map change.

21. The computer-readable storage device of claim 20, wherein the database management logic is operative to execute the database access operation prior to a completion of the clone data map change, such that the database access operation is performed using the first version of the clone data.

22. The computer-readable storage device of claim 21, wherein the database management logic is further operative to permit concurrent requests to access the first version of clone data and the second version of clone data.

23. The computer-readable storage device of claim 20, wherein when the first version of clone data and the second version of clone data are not equivalent with respect to a specified operation requested in the database query, the specified operation in the database query is completed after waiting for a clone data map transition to complete, wherein the specified operation accesses the second version of clone data in response to the database query after the clone data map transition is complete.

24. The computer-readable storage device of claim 23, wherein the waiting may include one of:
an interruptive state configured to signal other transactions to release locks that block completion of the clone data map change; and
a friendly state configured to passively wait until other transactions release locks that block completion of the clone data map change.

* * * * *